(12) United States Patent
Barr

(10) Patent No.: US 7,772,316 B2
(45) Date of Patent: Aug. 10, 2010

(54) HIGH TEMPERATURE POLYAMIDE COATING FOR FASTENERS

(75) Inventor: James A. Barr, Rochester Hills, MI (US)

(73) Assignee: ND Industries, Inc., Clawson, MI (US)

( * ) Notice: Subject to any disclaimer, the term of this patent is extended or adjusted under 35 U.S.C. 154(b) by 1091 days.

(21) Appl. No.: 11/386,260

(22) Filed: Mar. 22, 2006

(65) Prior Publication Data

US 2007/0225444 A1   Sep. 27, 2007

(51) Int. Cl.
| | |
|---|---|
| C08G 59/60 | (2006.01) |
| C08L 63/02 | (2006.01) |
| C08L 77/08 | (2006.01) |
| B32B 27/34 | (2006.01) |
| D02G 3/00 | (2006.01) |

(52) U.S. Cl. ............... 524/494; 428/395; 428/408; 523/404; 523/418; 524/514; 524/538; 524/540; 525/430

(58) Field of Classification Search ............... 524/494, 524/514, 538, 540; 428/395, 408; 523/404, 523/418; 525/430
See application file for complete search history.

(56) References Cited

U.S. PATENT DOCUMENTS

| | | | |
|---|---|---|---|
| 3,568,746 A | 3/1971 | Faroni et al. | |
| 3,642,937 A | 2/1972 | Deckert et al. | |
| 3,950,579 A | 4/1976 | Wallace | |
| 4,059,136 A | 11/1977 | Wallace | |
| 4,081,012 A | 3/1978 | Wallace | |
| 4,262,038 A | 4/1981 | Wallace | |
| 4,268,544 A | 5/1981 | Wallace | |
| 4,279,943 A | 7/1981 | Wallace | |
| 4,285,378 A | 8/1981 | Wallace | |
| 4,321,885 A | 3/1982 | Wallace | |
| 4,325,985 A | 4/1982 | Wallace | |
| 4,399,166 A | 8/1983 | Wallace | |
| 4,420,604 A | 12/1983 | Wallace | |
| 4,428,981 A | 1/1984 | Wallace | |
| 4,428,982 A | 1/1984 | Wallace | |
| 4,501,041 A | 2/1985 | Wallace | |
| 4,508,759 A | 4/1985 | Wallace | |
| 4,545,712 A | 10/1985 | Wallace | |
| 4,686,272 A | 8/1987 | Wallace | |
| 4,764,579 A | 8/1988 | Wallace | |
| 4,847,113 A | 7/1989 | Wallace | |
| 4,851,175 A | 7/1989 | Wallace | |
| 4,891,244 A | 1/1990 | Wallace | |
| 5,000,636 A | 3/1991 | Wallace | |
| 5,202,365 A | 4/1993 | Wallace | |
| RE34,522 E | 1/1994 | Wallace | |
| 5,397,618 A | 3/1995 | Cedarleaf | |
| 5,426,130 A | 6/1995 | Thruber et al. | |
| 5,518,768 A | 5/1996 | Wallace et al. | |
| 5,607,720 A | 3/1997 | Wallace et al. | |
| 5,651,824 A | 7/1997 | Wallace et al. | |
| 5,656,325 A | 8/1997 | Wallace | |
| 5,672,376 A | 9/1997 | Wallace | |
| 5,679,160 A | 10/1997 | Wallace et al. | |
| 5,918,727 A | 7/1999 | Wallace et al. | |
| 5,928,711 A | 7/1999 | Wallace et al. | |
| 5,964,551 A | 10/1999 | Wallace | |
| 6,027,568 A | 2/2000 | Wallace et al. | |
| 6,063,437 A | 5/2000 | Wallace et al. | |
| 6,228,169 B1 | 5/2001 | Wallace | |
| 6,270,838 B1 | 8/2001 | Wallace et al. | |
| 6,322,628 B1 | 11/2001 | Wallace | |
| 6,474,919 B2 | 11/2002 | Wallace et al. | |
| 6,565,969 B1 | 5/2003 | Lamon et al. | |
| 6,817,816 B2 | 11/2004 | Hill | |
| 2003/0078348 A1 | 4/2003 | Rajagopalan et al. | |
| 2004/0258922 A1 | 12/2004 | Willett et al. | |
| 2004/0266899 A1 | 12/2004 | Muenz et al. | |

*Primary Examiner*—Ana L Woodward
(74) *Attorney, Agent, or Firm*—Winston & Strawn LLP

(57) ABSTRACT

A high temperature polyamide coating and a fastener coated with a composition that includes from about 60 wt. % to about 80 wt. % of an aliphatic polyamide having a repeating unit. The composition also includes from about 3 wt. % to about 9 wt. % of an epoxy based resin having a molecular weight in the range from about 525 to about 585, from about 4 wt. % to about 10 wt. % of a ceramic microsphere material and from about 2 wt. % to about 5 wt. % of a thermoplastic methacrylate binder, from about 4 wt. % to about 12 wt. % of crushed glass, from about 0.1 wt. % to about 1 wt. % of a polyamide with a secondary amino group as a curing agent, and the balance of an epoxy based curing agent.

17 Claims, No Drawings

HIGH TEMPERATURE POLYAMIDE COATING FOR FASTENERS

BACKGROUND OF THE INVENTION

1. Field of the Invention

The present invention relates generally to fasteners and, more particularly, to a high temperature polyamide coating adhered to at least a portion of threads of a fastener.

2. Description of the Related Art

It is known to provide a self-locking fastener for fastening parts together. Self-locking fasteners are of a type in which the self-locking characteristic is derived from a coating such as a patch material adhered to all or a portion of a thread defining surface of the fasteners. These self-locking fasteners have proven to be very popular for a wide variety of applications in order to prevent loosening of the fastener due to vibration and the like in various applications.

Self-locking fasteners have been used in military, aircraft, and automotive applications. However, in some applications, these fasteners are subjected to a high temperature or corrosive environment. As a result, the coating may not withstand the high temperature and therefore loose its self-locking characteristic.

Therefore, it is desirable to provide a coating for a fastener that can withstand high temperatures and provide self-locking characteristics for the fastener. It is also desirable to provide a polyamide coating for a fastener that can withstand high temperatures and provide self-locking characteristics for the fastener. Thus, there is a need in the art to provide a high temperature polyamide coating for a fastener that meets these desires.

SUMMARY OF THE INVENTION

It is, therefore, one object of the present invention to provide a high temperature polyamide coating for a fastener.

It is another object of the present invention to provide a high temperature nylon coating for a fastener that imparts self-locking characteristics to the fastener.

Accordingly, the present invention is a high temperature polyamide coating for a fastener. The coating is a composition from about 60 wt. % to about 80 wt. % of an aliphatic polyamide having a repeating unit. The composition also includes from about 3 wt. % to about 9 wt. % of an epoxy based resin having a molecular weight in the range from about 525 to about 585. The composition includes from about 4 wt. % to about 10 wt. % of a ceramic microsphere material and from about 2 wt. % to about 5 wt. % of a thermoplastic methacrylate binder. The composition also includes from about 4 wt. % to about 12 wt. % of crushed glass. The composition includes from about 0.1 wt. % to about 1 wt. % of an amine curing agent. The composition further includes a balance comprised of an epoxy based curing agent.

In addition, the present invention is a fastener including a thread defining surface. The fastener also includes a high temperature polyamide coating adhered to at least a portion of the thread defining surface to lock a fastener in place and be able to withstand temperatures from about −54° C. (−65° F.) to about 250° C. (482° F.).

One advantage of the present invention is that a high temperature polyamide coating is provided for a fastener. Another advantage of the present invention is that the high temperature polyamide coating has a formulation that exhibits high temperature resistance properties, good anticorrosion properties, and is excellent for application to the threads of fasteners to lock the fastener in place in high temperature and corrosive applications. Yet another advantage of the present invention is that the high temperature polyamide coating is applied to at least a portion of the threads of the fastener to form a self-locking fastener.

Other objects, features, and advantages of the present invention will be readily appreciated, as the same becomes better understood, after reading the subsequent description.

DESCRIPTION OF THE PREFERRED EMBODIMENT(S)

The present invention is a high temperature polyamide coating or a high temperature resistant polyamide composition for adding corrosion resistance and locking properties to fasteners upon which is applied. The composition has a formulation comprised of an aliphatic polyamide having a repeating unit $C_{11}H_{21}ON$, a glass transition temperature of 42° C., an amorphous density at 25° C. of 1.01 g/cm$^3$, and a molecular weight of the repeating unit of 183.30 g/mol. The composition includes from about 60 wt. % to about 80 wt. % of the aliphatic polyamide having a repeating unit $C_{11}H_{21}ON$ and more preferably about 73.9 wt. % of such a polyamide. This aliphatic polyamide is a nylon material commonly known as Nylon 11 and is derived from 11 amino undecanoic acid in a manner that is known to those skilled in the art. Nylon 11 is a product that is available from a number of producers such as the Rohm and Hass Company of Flying Hills, Pa.

The composition also includes the addition of an effective amount of a ceramic microsphere material. These ceramic microsphere materials are typically used to reduce the VOC levels, increase filler loadings, improve hardness, and add burnish, scrub, and abrasion resistance to the formulation. Preferably, the ceramic microspheres are hollow spheres with thick walls comprised of silica-alumina ceramic material. The ceramic microsphere material has a true-density of about 2.1 to about 2.5 gm/cc and an average particle size distribution of from about 1 to about 200 microns. The ceramic microsphere material has a surface area of about 2 to about 6 m$^2$/cc and an oil absorption of about 60 gm to about 70 gm of oil per 100 cc of microspheres. These ceramic microspheres are added to the formulation to promote smoother powder coating finishes. They are available under a variety of tradenames and are available through the 3M Corporation under the tradename Zeeosphere Ceramic microspheres. Of particular interest is Zeeosphere G-600. The ceramic microspheres are present in an amount of from about 4 wt. % to about 10 wt. % of the composition and most preferably in an amount of about 7.66 wt. % of the composition.

The composition further includes from about 2 wt. % to about 5 wt. % of a thermoplastic methacrylate based binder, and preferably about 3.29 wt. % of a methacrylate based binder. The methacrylate based binders may be selected from the group of poly(benzylmethacrylate), poly(butylmethacrylate), poly(cyclohexylmethacrylate), poly(ethylmethacrylate), poly(hexylmethacrylate), poly(isobutylmethacrylate), poly(isopropylmethacrylate), poly(isopropylmethacrylate), poly(methylmethacrylate), poly(phenyl methacrylate), poly(propyl methacrylate), and mixtures thereof. Most preferably, poly(methyl methacrylate) is used in the present formulation. This thermoplastic methacrylate based binder is available under a number of tradename products, such as Degalan® LP 64/12, available from Degussa Corporation of Parsippany, N.J.

The composition includes from about 4 wt. % to about 12 wt. % of a crushed glass material and preferably about 8.72 wt. % of the crushed glass material. The crushed glass material is used to impart corrosion resistance and temperature resistance properties to the composition.

The composition further includes from about 3 wt. % to about 9 wt. % of a low molecular weight solid epoxy based resin derived from liquid epoxy resin and bisphenol A. The resin has a micro weight range of about 525 grams per mol to about 585 grams per mol. This material is available under a number of tradenames such as Epon®1001F available from Resolution Performance Products or any other number of providers. The material is useful in polyamide cured coatings where chemical resistance, durability, toughness, and adhesion properties of the coating are desired. It is also used to upgrade thermosetting acrylic resins coatings with greatly improved adhesion toughness and detergent resistance. For these reasons, the coating utilizing this material is especially useful in automotive and aircraft applications.

The composition also includes from about 0.1 wt. % to about 1 wt. % of an amine curing agent. Such curing agents are known under the trade name Ancamine® curing agents and, in particular interest, is Ancamine 2014AS available from Air Products of Allentown, Pa.

Finally, the composition includes an effective amount of an epoxy based curing agent and specifically a curing agent in an amount of about 0.37 wt. % of epoxy based curing agent. Of particular interest is Curezol® 2MZ curing agent available from Air Products of Allentown, Pa.

The composition as described herein is useful as a coating or patch to be applied to the threads of fasteners for use in high temperature applications such as that encountered in automotive or aircraft applications. A patch would be applied as a powder to the threads of a heated fastener so that the formulation is adhered to the threads of the fastener. The formulation meets MIL-DTL-18240F and serves to lock the fastener in place and further to offer corrosion resistant properties to the threads of the fastener.

The following examples describe the present invention in more detail. The parts and percentages unless otherwise indicated are parts and percentages by weight of the composition.

EXAMPLES

Examples I through V are offered to illustrate the torque used to remove fasteners that were treated with the composition as previously described. For each of the Examples I through V, the indicated number of threaded fasteners were coated with a composition comprised of 73.9 wt. % of Nylon 11, 8.72 wt. % crushed glass, 7.66 wt. % Zeeospheres G-600, 3.29 wt. % Degalan LP 64/12, 5.51 wt. % Epon 1001F, 0.55 wt. % Ancamine, and 0.37 wt. % Curezol 2MZ. Samples of coated fasteners were baked at 482° F. (250° C.) for three (3) hours and allowed to cool for a minimum of one (1) hour. The samples of coated fasteners were mated with threaded receivers to simulate actual fastener systems. The samples of coated fasteners were subjected to five (5) removal processes from the threaded receivers, and the torque necessary to remove the fasteners was recorded. Torque was measured in foot-pounds.

Example I

Example I illustrates the prevailing take off torque through five (5) reuses of the coated fasteners set forth above, applying a maximum torque of 7.5 and a minimum torque of 0.5.

The prevailing off torque is given in Table 1 below:

TABLE 1

| SAMPLE | $1^{st}$ | $2^{nd}$ | 3rd | 4th | 5th |
|---|---|---|---|---|---|
| 1 | 3 | 4.5 | 1.5 | 2 | 1.5 |
| 2 | 5 | 4 | 4 | 4.5 | 4.5 |
| 3 | 1.5 | 1 | 2.5 | 1.5 | 2 |
| 4 | 1.5 | 1 | 2.5 | 1.5 | 2 |
| 5 | 7 | 4.5 | 4.5 | 4 | 4 |
| 6 | 5.5 | 4 | 4 | 4 | 4 |
| 7 | 5.5 | 4.5 | 4.5 | 4.5 | 4.5 |
| 8 | 4.5 | 4 | 4 | 3.5 | 3.5 |
| 9 | 5.5 | 5.5 | 5.5 | 5.5 | 5.5 |
| 10 | 1.5 | 1.5 | 1 | 2 | 2 |

Example II

Example II illustrates the prevailing take off torque through five (5) reuses of the coated fasteners set forth above, applying a maximum torque of 12.0 and a minimum torque of 1.0. The prevailing off torque is given in Table 2 below:

TABLE 2

| SAMPLE | $1^{st}$ | 2nd | 3rd | 4th | 5th |
|---|---|---|---|---|---|
| 1 | 3 | 2 | 5 | 4 | 4 |
| 2 | 5 | 5 | 4 | 4 | 4 |
| 3 | 7.5 | 4 | 5 | 4 | 3 |
| 4 | 12 | 7 | 10 | 6 | 6 |
| 5 | 5 | 4 | 4 | 4 | 4 |
| 6 | 5 | 4 | 4 | 3.5 | 4 |
| 7 | 3 | 3 | 6 | 2 | 4 |
| 8 | 7 | 5.5 | 7 | 5 | 4.5 |
| 9 | 4 | 3 | 3 | 3 | 3 |
| 10 | 4 | 3.5 | 4 | 5 | 4 |

Example III

Example III illustrates the prevailing take off torque through five (5) reuses of the coated fasteners set forth above, applying a maximum torque of 18.0 and a minimum torque of 1.5. The prevailing off torque is given in Table 3 below:

TABLE 3

| SAMPLE | 1st | 2nd | 3rd | 4th | 5th |
|---|---|---|---|---|---|
| 1 | 15 | 11 | 11.5 | 11 | 11 |
| 2 | 10.5 | 10 | 10 | 10.5 | 11 |
| 3 | 16 | 14 | 15 | 14 | 13.5 |
| 4 | 11 | 10 | 10 | 9 | 9 |
| 5 | 18 | 13 | 12 | 12 | 12 |
| 6 | 16 | 15 | 21 | 14.5 | 13 |
| 7 | 10.5 | 11 | 10 | 10 | 9 |
| 8 | 14.5 | 14.5 | 14 | 14 | 13.5 |
| 9 | 11 | 13 | 13 | 13 | 13 |
| 10 | 13 | 105. | 8.5 | 8 | 7 |

Example IV

Example IV illustrates the prevailing take off torque through five (5) reuses of the coated fasteners set forth above, applying a maximum torque of 60.0 and a minimum torque of 3. The prevailing off torque is given in Table 4 below:

TABLE 4

| SAMPLE | 1st | 2nd | 3rd | 4th | 5th |
|---|---|---|---|---|---|
| 1 | 30 | 19 | 15 | 18 | 10 |
| 2 | 17 | 8 | 11 | 8 | 8 |
| 3 | 23 | 18 | 16 | 15 | 15 |
| 4 | 9 | 8 | 7 | 13 | 15 |
| 5 | 8 | 6 | 8 | 7 | 8 |
| 6 | 10 | 8 | 15 | 16 | 10 |
| 7 | 6 | 10 | 7 | 7 | 5 |
| 8 | 10 | 8 | 10 | 10 | 11 |
| 9 | 19 | 16 | 9.5 | 9 | 14 |
| 10 | 20 | 10 | 18.5 | 15 | 11.5 |

Example V

Example V illustrates the prevailing take off torque through five (5) reuses of the coated fasteners set forth above, applying a maximum torque of 165 and a minimum torque of 9.0. The prevailing off torque is given in Table 5 below:

TABLE 5

| SAMPLE | 1st | 2nd | 3rd | 4th | 5th |
|---|---|---|---|---|---|
| 1 | 50 | 40 | 41 | 40 | 40 |
| 2 | 125 | 125 | 102 | 100 | 100 |
| 3 | 50 | 50 | 50 | 52 | 51 |
| 4 | 51 | 48 | 38 | 30 | 29 |
| 5 | 65 | 46 | 46 | 43 | 55 |
| 6 | 69 | 37 | 36 | 35 | 35 |
| 7 | 32 | 20 | 25 | 17 | 20 |
| 8 | 81 | 60 | 58 | 29 | 28 |
| 9 | 78 | 33 | 31 | 30 | 30 |
| 10 | 40 | 25 | 30 | 23 | 23 |

In the following Examples VI through X, the fasteners were coated with the same composition or formulation as the fasteners of previous Examples I through V. However, the fasteners of Examples VI through X were baked for one (1) hour at 500° F. While the fasteners were at this temperature, the prevailing off torque in foot-pounds was measured.

Example VI

Example VI illustrates the prevailing take off torque of the coated fasteners set forth above, applying a maximum torque of 7.5 and a minimum torque of 0.5. The prevailing off torque is given Table 6 below:

TABLE 6

| SAMPLE | 1st |
|---|---|
| 1 | 5 |
| 2 | 4 |
| 3 | 6.5 |
| 4 | 9 |
| 5 | 7 |
| 6 | 6.5 |
| 7 | 6.5 |
| 8 | 1.5 |
| 9 | 2.5 |
| 10 | 3 |

Example VII

Example VII illustrates the prevailing take off torque of the coated fasteners set forth above, applying a maximum torque of 12.0 and a minimum torque of 1.0. The prevailing off torque is given Table 7 below:

TABLE 7

| SAMPLE | 1st |
|---|---|
| 1 | 6 |
| 2 | 3 |
| 3 | 3 |
| 4 | 4 |
| 5 | 2 |
| 6 | 2.5 |
| 7 | 3 |
| 8 | 3.5 |
| 9 | 4 |
| 10 | 5 |

Example VIII

Example VIII illustrates the prevailing take off torque of the coated fasteners set forth above, applying a maximum torque of 18.0 and a minimum torque of 1.5. The prevailing off torque is given in Table 8 below:

TABLE 8

| SAMPLE | 1st |
|---|---|
| 1 | 10 |
| 2 | 10 |
| 3 | 7 |
| 4 | 9 |
| 5 | 7 |
| 6 | 14 |
| 7 | 5 |
| 8 | 15 |
| 9 | 20 |
| 10 | 10 |

Example IX

Example IX illustrates the prevailing take off torque of the coated fasteners set forth above, applying a maximum torque of 60.0 and a minimum torque of 3. The prevailing off torque is given in Table 9 below:

TABLE 9

| SAMPLE | 1st |
|---|---|
| 1 | 15 |
| 2 | 8 |
| 3 | 19 |
| 4 | 16 |
| 5 | 15 |
| 6 | 9 |
| 7 | 12 |
| 8 | 8 |
| 9 | 14 |
| 10 | 18 |

Example X

Example X illustrates the prevailing take off torque of the coated fasteners set forth above, applying a maximum torque of 165 and a minimum torque of 9.0. The prevailing off torque is given in Table 10 below:

TABLE 10

| SAMPLE | 1st |
| --- | --- |
| 1 | 30 |
| 2 | 50 |
| 3 | 45 |
| 4 | 20 |
| 5 | 21 |
| 6 | 30 |
| 7 | 35 |
| 8 | 19 |
| 9 | 55 |

The present invention has been described in an illustrative manner. It is to be understood that the terminology, which has been used, is intended to be in the nature of words of description rather than of limitation and the examples are intended to illustrate and not limit the scope of the present invention.

Many modifications and variations of the present invention are possible in light of the above teachings. Therefore, within the scope of the appended claims, the present invention may be practiced other than as specifically described.

What is claimed is:

1. A high temperature polyamide composition comprising:
   (a) from about 60 to about 80 percent by weight of an aliphatic polyamide;
   (b) from about 3 to about 9 percent by weight of an epoxy based resin having a molecular weight in the range of about 525 to about 585;
   (c) from about 4 to about 10 percent by weight of a ceramic microsphere material;
   (d) from about 2 to about 5 percent by weight of a methacrylate based binder;
   (e) from about 4 to about 12 percent by weight of a crushed glass material;
   (f) from about 0.1 to about 1 percent by weight of an aliphatic amine curing agent; and
   (g) the balance comprised of a curing agent for the epoxy based resin.

2. The high temperature polyamide composition as set forth in claim 1 wherein said methacrylate based binder is selected from the group consisting of poly(benzyl methacrylate), poly(butyl methacrylate), poly(cyclohexyl methacrylate), poly(ethyl methacrylate), poly(hexyl methacrylate), poly(isobutyl methacrylate), poly(isopropyl methacrylate), poly(methyl methacrylate), poly(phenyl methacrylate), poly(propyl methacrylate), and mixtures thereof.

3. The high temperature polyamide composition as set forth in claim 2 wherein said methacrylate based binder is poly(methyl methacrylate).

4. The high temperature polyamide composition as set forth in claim 1 wherein said aliphatic polyamide is selected from the group consisting of polyamide 11.

5. The high temperature polyamide composition as set forth in claim 1 wherein said epoxy based resin is selected from the group consisting of Bisphenol A Epoxy.

6. The high temperature polyamide composition as set forth in claim 1 wherein said ceramic micro-sphere material has micro-spheres with a diameter of about 40 microns.

7. The high temperature polyamide composition as set forth in claim 1 wherein the temperature is in the range of from about −54° C. (−65° F.) to about 250° C. (482° F.).

8. The high temperature polyamide composition as set forth in claim 1 wherein said crushed glass material is comprised of particles having a size of 70 microns.

9. The high temperature polyamide composition as set forth in claim 1 wherein said composition is resistant to degradation in properties up to 482° F.

10. A high temperature nylon coating for a fastener comprising:
    (a) 73.90% by weight of an aliphatic polyamide;
    (b) 7.66% by weight of a ceramic microsphere material;
    (c) 8.72% by weight of a crushed glass material;
    (d) 3.29% by weight of a poly (methyl methacrylate) binder;
    (e) 5.51% by weight of a thermoplastic epoxy based resin material;
    (f) 0.55% by weight of an aliphatic amine curing agent; and
    (g) the balance of a curing agent for the epoxy based resin material.

11. The high temperature nylon coating as set forth in claim 10 wherein said aliphatic polyamide is Nylon 11.

12. The high temperature nylon coating as set forth in claim 10 wherein said ceramic micro-sphere is Zeeosphere® G-600.

13. The high temperature nylon coating as set forth in claim 10 wherein said poly (methyl methacrylate) is Degalan® LP 64/12.

14. The high temperature nylon coating as set forth, in claim 10 wherein said thermoplastic epoxy resin coating material is Epon® 1001F.

15. The high temperature nylon coating as set forth in claim 10 wherein said aliphatic polyamine based amine curing agent is Ancamine® 2014 AS.

16. The high temperature nylon coating as set forth in claim 10 wherein said curing agent for the epoxy based resin material is Curezol® 2MZ.

17. The high temperature nylon coating as set forth in claim 10 wherein said formula is resistant to degradation in properties up to 482° F.

* * * * *

UNITED STATES PATENT AND TRADEMARK OFFICE
CERTIFICATE OF CORRECTION

PATENT NO. : 7,772,316 B2  Page 1 of 1
APPLICATION NO. : 11/386260
DATED : August 10, 2010
INVENTOR(S) : Barr It is certified that error appears in the above-identified patent and that said Letters Patent is hereby corrected as shown below:

Column 8:
Line 43 (claim 15, line 2), delete "polyamine based".

Signed and Sealed this

Seventh Day of December, 2010

David J. Kappos
*Director of the United States Patent and Trademark Office*